United States Patent
Hund

(10) Patent No.: US 10,400,811 B2
(45) Date of Patent: Sep. 3, 2019

(54) MACHINE ELEMENT

(71) Applicant: Spieth-Maschinenelemente GmbH & Co. KG, Esslingen (DE)

(72) Inventor: Alexander Hund, Aichwald (DE)

(73) Assignee: SPIETH-MASCHINENELEMENTE GMBH & CO. KG, Esslingen (DE)

( * ) Notice: Subject to any disclaimer, the term of this patent is extended or adjusted under 35 U.S.C. 154(b) by 73 days.

(21) Appl. No.: 15/104,579

(22) PCT Filed: Feb. 10, 2015

(86) PCT No.: PCT/EP2015/000289
§ 371 (c)(1),
(2) Date: Jun. 15, 2016

(87) PCT Pub. No.: WO2015/120976
PCT Pub. Date: Aug. 20, 2015

(65) Prior Publication Data
US 2016/0327084 A1 Nov. 10, 2016

(30) Foreign Application Priority Data
Feb. 11, 2014 (DE) ........................ 10 2014 002 191

(51) Int. Cl.
*F16B 39/02* (2006.01)
*F16C 17/02* (2006.01)
*F16D 1/08* (2006.01)

(52) U.S. Cl.
CPC ............ *F16B 39/028* (2013.01); *F16C 17/02* (2013.01); *F16D 1/0811* (2013.01)

(58) Field of Classification Search
CPC ... B23C 5/2468; B23C 5/2265; F16B 39/028; F16C 17/02; F16D 1/0811; F16D 1/08;
(Continued)

(56) References Cited

U.S. PATENT DOCUMENTS

| 171,898 A | * | 1/1876 | Wiles | .................... F16B 39/028 |
| | | | | 285/92 |
| 2,863,210 A | * | 12/1958 | Tucker | .................... B23C 5/242 |
| | | | | 407/45 |

(Continued)

FOREIGN PATENT DOCUMENTS

| DE | 393 662 | 4/1924 |
| DE | 25 44 498 | 4/1977 |

(Continued)

OTHER PUBLICATIONS

International Search Report (ISR) dated May 13, 2015 in International (PCT) Application No. PCT/EP2015/000289.

*Primary Examiner* — Amber R Anderson
*Assistant Examiner* — Nahid Amiri
(74) *Attorney, Agent, or Firm* — Wenderoth, Lind & Ponack, L.L.P.

(57) ABSTRACT

A machine element includes individual ring components (10, 12) fastenable to third components, such as axles, shafts, or hubs. One ring component can be actuated toward another ring component in an advancing motion by an adjusting device (18) in an axial direction (Y). An angled force application to the one ring component (10) in a tilted direction (24) that deviates from the axial advancing direction (Y) occurs by the adjusting device (18) for the advancing motion. The ring component that is exposed to the angled force application follows the tilted direction by a contact surface (30) for the contact with the adjusting device (18). In a thread-free segment of the adjusting device (18), the adjusting device has a titled control surface (32). The adjusting device then follows the contact surface (30) with its tilted direction (24) when the adjusting device (18) is actuated.

10 Claims, 2 Drawing Sheets

(58) Field of Classification Search
CPC ....... Y10T 403/32008; Y10T 403/7011; Y10T 403/7051; Y10T 403/7052; Y10T 403/7062; Y10T 403/7064; Y10T 403/7066; Y10T 403/7067; Y10T 403/7069
USPC .............. 403/53, 351, 367, 368; 407/45, 49; 411/286
See application file for complete search history.

(56) References Cited

U.S. PATENT DOCUMENTS

| | | | | |
|---|---|---|---|---|
| 4,486,116 A | * | 12/1984 | Sassi | F16B 2/02 292/349 |
| 4,898,398 A | * | 2/1990 | Cassel | A63C 17/01 280/11.28 |
| 7,192,233 B2 | * | 3/2007 | Migita | F16B 39/286 411/230 |
| 8,221,043 B2 | * | 7/2012 | Guyton | F16B 1/0014 411/511 |
| 8,562,001 B2 | * | 10/2013 | Taguchi | B23B 31/201 279/42 |
| 8,567,034 B2 | * | 10/2013 | Hofmann | B25B 27/10 29/237 |

FOREIGN PATENT DOCUMENTS

| | | | | |
|---|---|---|---|---|
| DE | 4323362 A1 | * | 2/1994 | ............. F16B 39/02 |
| DE | 43 39 978 | | 6/1995 | |
| DE | 10105747 A1 | * | 8/2002 | ............. F16B 39/028 |
| DE | 102014002192 A1 | * | 8/2015 | ............. F16B 39/028 |
| FR | 2 923 742 | | 5/2009 | |
| GB | 953144 | | 12/1963 | |
| GB | 1392182 A | * | 4/1975 | ............. F16B 2/246 |

* cited by examiner

MACHINE ELEMENT

FIELD OF THE INVENTION

The invention relates to a machine element, comprising individual ring components, which can be fixed to third components, such as axles, shafts or hubs. At least one ring component can be actuated towards at least one additional ring component in a feeding movement by an adjusting device as viewed in an axial direction. An angled force application to at least one of the ring components in a tilted direction that deviates from the axial feeding direction occurs by the adjusting device for the feeding movement. The ring component that is exposed to the angled force application follows the tilted direction by at least part of a contact surface for the contact with the adjusting device.

BACKGROUND OF THE INVENTION

Such machine elements can be used in a large number of potential areas of application. If the machine element is used as a clamping unit, this use allows force-fit shaft-hub connections to be made due to the ring component construction with an adjusting device. For such an application, care is taken to ensure that the geometry of the individual component annular bodies used results in a base body that is as absolutely symmetrical as possible. An axial compression of the ring components by the adjusting device then results in a uniform transverse contraction towards the shaft and hub. The centering effect achievable is then classifiable at the level of the hydroexpansion principle, and is achieved with a much simpler, safer and more rigid construction than comparative solutions. To allow a high force application by the adjusting device, steel materials are substantially used, including for the individual ring components.

Another application as a machine element is in the context of guide sleeves, which constitute round linear guiding elements for machine construction and fixture and jig construction. The use of such guide sleeves is appropriate when the advantages of the slide-type guiding, e.g. a high level of damping, are to be made use of and, at the same time, minimal guide clearance is required. The guide sleeves are then employed in particular on guide racks, on round carriage guides and on tailstock sleeves. In addition to the mentioned linear movement, simultaneous rotational movements are also possible, whereas a pure rotational movement as in the case of a slide bearing is not realized for lubrication reasons. Because a joint play should be optimally adjustable for each operating condition by the guide sleeves, flexible materials are often used, for example in the form of bronze materials.

Because hydrodynamically lubricated, adjustable multi-surface radial slide bearings, as are used mainly in machine construction, likewise have ring components that can be braced against one another by an adjusting device, the basic solutions developed for clamping units and guide sleeves can also be applied to such radial slide bearing solutions.

However, particularly preferably, adjusting nut solutions or threaded rings are used, which, with great accuracy and uniform clamping forces with respect to their thread flank, can be fixed to spindle threads and the like more in the manner of third components.

An example of such an adjusting nut as a machine element is presented in DE 25 44 498 C3. In this known solution, a threaded ring serves as an adjusting nut, which is formed in one piece, and which is divided by an annular groove starting from the external circumferential surface. By an annular groove, disposed offset thereto and starting from the internal circumferential surface, into two rings in the form of a counter ring and an adjusting ring that can be contacted against an annular body to be clamped and, disposed between them, a significantly narrower spacer ring is provided. The space ring is connected at its internal circumference to one of the rings and at its external circumference to the other of these rings. The counter ring and the spacer ring have a common thread on their connection point side. The threaded ring can be braced by a number of screws extending parallel to its axis, each separately adjustable, disposed and uniformly distributed on a mean circumference. The screws are screwed into the counter ring, passing through the spacer ring with clearance and are supported on the adjusting ring.

This known machine element solution then uses a total of three ring components, which are permanently connected to one another in a back-to-back arrangement by diaphragm parts with thin-walled wall sections. Several adjusting bolts or threaded bolts uniformly distributed around the external circumference of the threaded ring serve as the adjusting device here.

If the threaded bolt has an enlarged head part diameter relative to the bolt part in accordance with the embodiment of FIG. 5, viewed in the axial adjusting direction a feeding movement occurs between at least a part of the ring components. The ring components can be moved towards one another, but also away from one another. The heads of the adjusting or threaded bolts formed as countersunk heads come into planar contact with the adjacent, facing and levelly extending contact surface of the first-in-succession annular body of the assemblage.

If only a small installation space viewed in the axial feeding direction is then available for the inserted machine element with its annular bodies, desirably the overall length of at least the ring component is reduced, on which ring component the head part of the threaded bolt or adjusting bolt can contact. However, because the threaded bolts and adjusting bolts themselves cannot be altered in terms of their geometrical dimensions and since they would then not be able to apply the required adjusting and feeding forces, a reduction of the axial installation length of that first ring component on the one hand would mean that the cylindrical screw head as the head part would then protrude and take up installation space. The residual wall thickness, which forms the contact surface for the contact with the head part of the threaded bolt or adjusting bolt, would cause a diaphragm-like bending or even a tearing apart of the residual support wall with the result that the overall machine element would be useless for the application. Nor is this situation changed if, essentially in accordance with the solutions according to FIGS. 1 through 4 of DE 25 44 498 C3, the head part has an external thread in an angled arrangement on its external circumferential side, which is in engagement with an internal threaded section of the first outside ring component.

The experts have acknowledged that this constitutes an essential problem to be solved. To remedy the mentioned drawbacks, DE 10 2004 003 183 A1 proposed a modified threaded ring solution. The known threaded ring, the one-piece body of which, provided with an internal thread, has two body parts in the form of two ring components. The first ring component forms an adjusting ring with an end-side planar surface lying in a radial plane. The second body part of the first ring component forms a retaining ring. The retaining is connected to the first body part, while forming a gap situated between both body parts by an elastically flexible wall part or diaphragm part of the body, and has an actuation device as an adjusting device. By the adjusting device, the geometry of the gap can be adjusted as a result of the elastic flexibility of the wall part or diaphragm part. The head bearing surfaces for the screw heads are designed as head parts of adjusting or threaded bolts inside the respective ring component in a defined angled manner in a tilted direction deviating from the axial feeding direction. The screw heads then come to contact at one side against the head bearing side of the adjacent threaded ring as a ring component. A threaded ring having improved efficiency is then produced that, with respect to the construction dimensions, can have a smaller construction than the solution mentioned above according to DE 25 44 498 C3.

This improved solution nevertheless still does not satisfy all requirements, with respect to the ability to apply, in a minimal axial installation space, the highest possible clamping or adjusting forces by the adjusting device to a ring component arrangement.

SUMMARY OF THE INVENTION

An object of the invention, on the basis of a generic machine element according to DE 10 2004 003 183 A1, is to provide improved machine elements, such as adjusting nuts or threaded rings, that have a high level of efficiency and a simple construction, that are inexpensive to manufacture and that can be realized such that they can be securely and efficiently fixed even when installation spaces are extremely small as in practice due to third components. Another object is to provide improved adjusting nuts, accessible for other machine elements, such as clamping units, guide sleeves or bearings, preferably in the form of radial slide bearings.

These objects are basically achieved by a machine element having an adjusting device including, in a non-threaded section thereof, a control surface that is tilted such that it follows a contact surface with its tilted direction in the case of an actuated adjusting device. This structure does have the result that, viewed in the axial feeding direction, only a smaller axial feeding force is obtained by the adjusting device compared with the known cylinder head screw solutions. Due to the tilted force application or angled force application by the respective tilted control surface and the correspondingly tilted contact surface in the non-threaded engagement section of the adjusting device, significantly higher friction can be generated across a larger angled surface region than in the case of effective angled force components. With a geometrically small construction adjusting device, the angled force applied is nevertheless sufficient to reliably position the ring components relative to one another on the third component, and to hold them in this respective position.

An average skilled professional in the field of such machine elements finds surprising that, despite his knowledge of the threaded ring solution according to DE 10 2004 003 183 A1, he can arrive at an even better engagement solution by providing the adjusting device with a tilted control surface that correspondingly conforms to the tilted contact surface on the adjacent ring component. The increased friction between contact surface and control surface allows the inserted threaded bolts or adjusting bolts of the adjusting device to be further miniaturized. In spite of very constricted installation dimensions, the ring components can be then effectively adjusted relative to one another. No equivalent of this design exists in the prior art, not even the prior art threaded engagement solutions between the external circumferential side of the screw head of the adjusting device and the corresponding internal thread of the ring part thus overlapping the screw head as a ring component.

If the internal and/or external thread that is standard for adjusting nuts is omitted on the respective ring components, additional machine element solutions are arrived at, such as clamping units, guide sleeves or bearings, such as radial slide bearings, for example. Those internal circumferential sides of thus cylindrically formed hollow ring components then serve as contact parts for components, respectively for third components, such as axles, shafts or hubs, etc., for example.

The frictional forces of the contact surface and the control surface can be significant. If necessary for an effective actuation as a measure for reducing the friction coefficient, the corresponding wall parts are treated suitably at the surfaces or are provided with a coating, such as a coat of lacquer to be applied, for example.

Particularly advantageously, the control surface is formed as a control cone, and the contact surface is formed as a contact cone. Preferably, the cones have the same inclination in order to realize a particularly high angled force application with high friction coefficients, so as to hold the adjusting device securely in position in the ring component assemblage. However, providing the angled surface contact over a shorter distance may suffice, for example, only over the width, or a part of the width, of the screw head. In addition, the contact surfaces can extend along a tangent or secant relative to the engagement bolts on the screw head and on the associated ring component. In particular, the common contact surfaces extend between the bottom side of the screw head and an adjacent cavity inside this ring component.

As mentioned above with respect to DE 25 44 498 C3, using just two ring components is not necessary. Three or more ring components may be used, at least a portion of which are integrally connected to one another by diaphragm parts reducing their wall thickness. However, the machine element can be realized with only two ring components, which assume a predeterminable axial spacing relative to one another without the use of diaphragm-shaped wall parts and are adjustably connected to one another only via the adjusting device.

The annular bodies employed in the solution according to the invention preferably have a uniformly round shape and form a circular closed object. The respective annular body is formed hollow cylindrical. It can also be formed as a solid closed body, in particular if this annular body with an external thread is to be inserted, in particular screwed into, corresponding internal threaded sections of hollow cylindrical third components. Instead of the uniformly round annulus area, the external contour of the respective annular body can also have a polygonal shape and, in particular, can also have an irregular external contour, in order to then form a working surface for fixing tools and handling systems. The machine element according to the invention in any case provides a solution by which this machine element can be fixed in a fail-safe and centering manner to third components. It therefore has no equivalent in the prior art.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure that are schematic and not to scale.

DETAILED DESCRIPTION OF THE INVENTION

Figure 1:
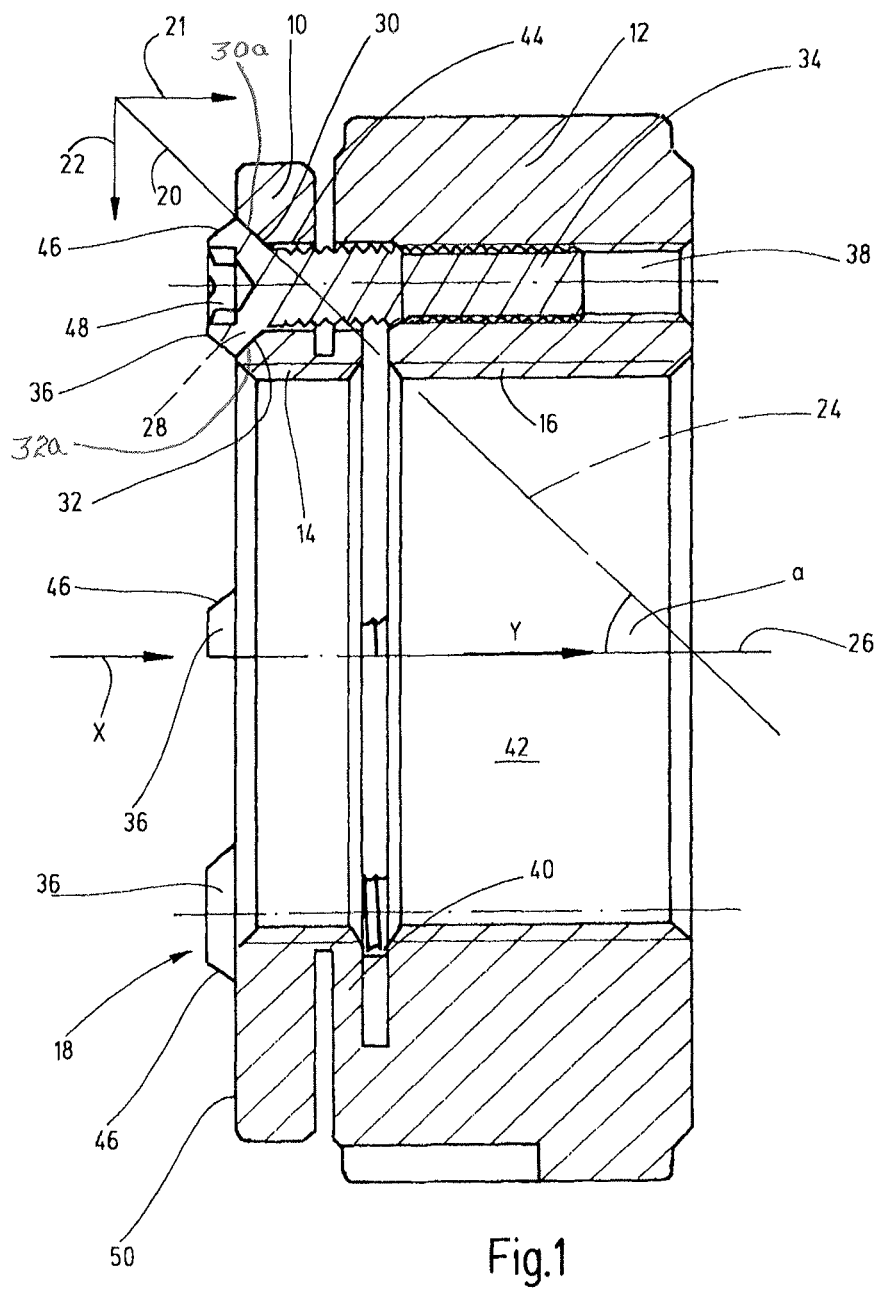
FIG. 1 is a side view in section of an adjusting nut, substantially having two ring components and an adjusting device, taken along the line I-I in FIG. 2 according to an exemplary embodiment of the invention.

The machine element shown in FIG. 1, which is referred to in technical terminology as an adjusting nut or a threaded ring, has two ring components 10, 12, of the sort that can be fixed to third components, such as axles, shafts or hubs, for example. For this purpose, the two ring components 10, 12 have, on their respective internal circumferential side, two continuous threaded sections 14, 16, which can be connected in a standard screwing or threaded manner to corresponding assignable threaded sections of third components (not depicted). At least the one or first ring component 10 can be moved by the adjusting device 18 in a feeding movement towards the additional or second ring component 12 in an axial direction shown by arrow Y in order to then brace against one another the various threaded sections. The threaded sections are engaged with one another, in a backlash-free manner and to then fix the adjusting nut securely in position on the third component (not depicted). The adjusting device 18 applies a friction-based angular force for the feeding movement of the two ring components 10, 12 towards one another, the force vector 20 of which is depicted in FIG. 1. This angular force 20 is able to be divided after a standard resolution of forces into an axial feeding force 21 and a radial feeding force 22.

As is also seen from FIG. 1, the angular force is applied along the force vector 20 onto the ring component 10 in a tilted direction 24 that, in a hypothetical extension with the longitudinal axis 26 of the whole machine element according to FIG. 1, encloses an angle a of approximately 45°. This angle value is preferred. Other solutions are conceivable with inclination angles a between 30° and 60°. The ring component 10 has a cavity 28 at the point of engagement with the adjusting device 18, which is delimited on the edge side towards the ring component 10 by a contact surface 30. This contact surface 30 of the ring component 10 follows the tilted direction 24 in accordance with the depiction according to FIG. 1. As can also be seen from FIG. 1, the adjusting device 18 is provided in a non-threaded section thereof with a tilted control surface 32, which follows the contact surface 30 with its tilted direction 24 in the case of an actuated adjusting device 18, whereby the adjusting device 18 is in contact with the ring component 10.

Figure 2:
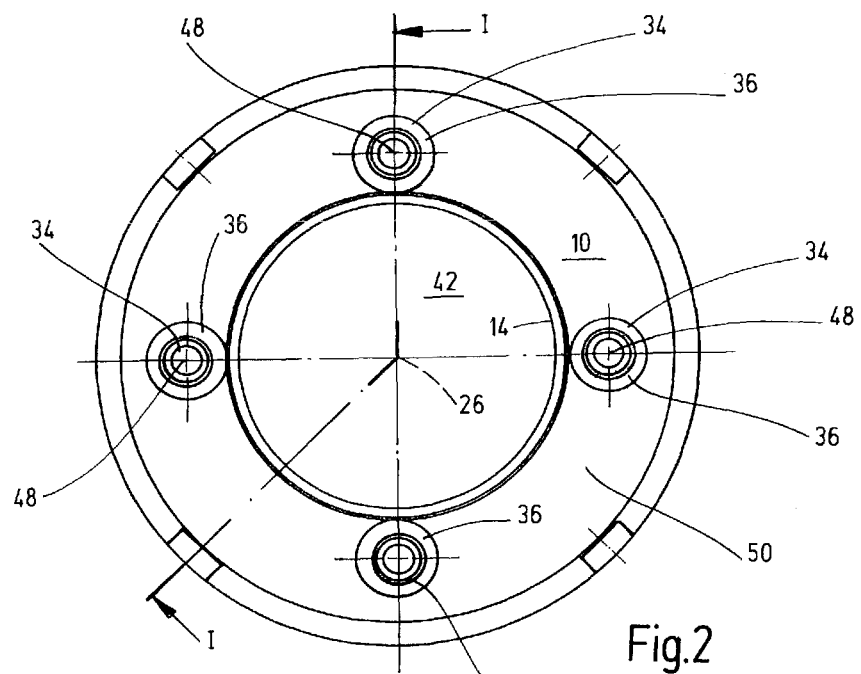
FIG. 2 a front-end view of the adjusting nut along the line of sight arrow X in FIG. 1.
Figure 3:
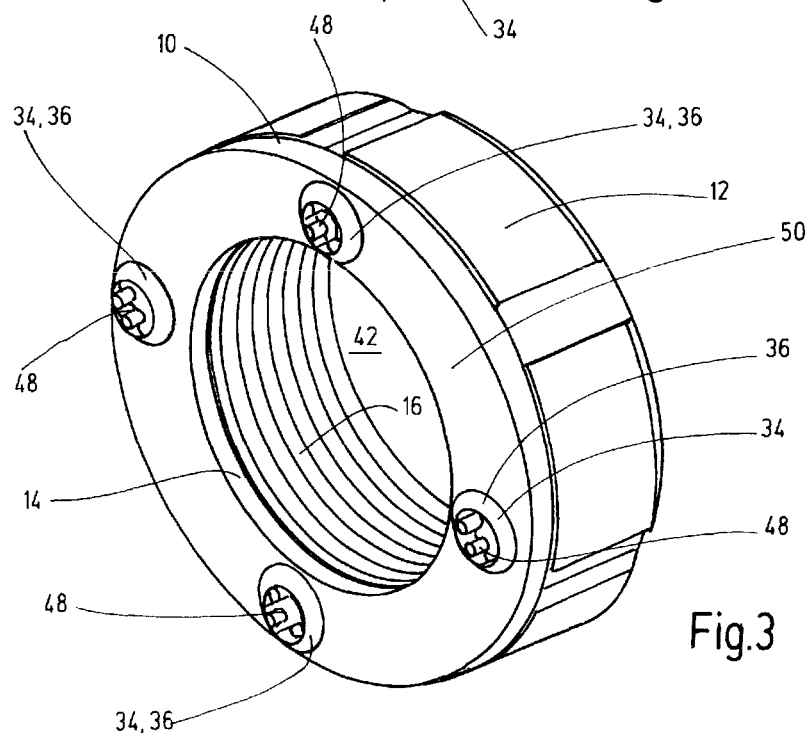
FIG. 3 a perspective view of the adjusting nut according to FIGS. 1 and 2.

In accordance with the depiction of FIGS. 2 and 3, the adjusting device 18 has a total of four adjusting bolts 34, with the respective adjusting bolt 34 acting in accordance with the depiction according to FIG. 1 to apply an angular force onto the ring component 10 by its head part 36. Head part 36 has a greater diameter relative to the adjusting bolt 34. The adjusting bolt 34 penetrates a through bore hole 44 in the edge side region of the ring component 10. At its free end, which lies facing away from and opposite the respective head part 36, the adjusting bolt is permanently connected by an external thread with the internal thread of a bore hole 38 inside the second ring component 12 to that second ring component. An adjustment of the adjusting bolt 34 by its associated head part 36 thus allows the flank clamping to be set for the two ring components 10, 12 in the case of a clamping or adjusting nut fixed to a third component (not depicted).

For this purpose, the enlarged head part 36 of each adjusting bolt 34 is provided, relative to the axial direction Y, with the tilted control surface 32 that, according to the depiction of FIG. 1, interacts with the tilted contact surface 30 of the first ring component 10 contacting against the head part 36, with the predeterminable inclination, i.e. the choice of the inclination angle a, of control surface 32 and contact surface 30 being selected the same. Furthermore, the degree of the inclination angle a and the degree of the overlap of the surfaces 30, 32 contacting against one another helps to determine the frictional force that can be generated as part of the angular force application.

Like the ring components 10, 12, which are formed substantially rotationally symmetrical to the longitudinal axis 26, the respective adjusting bolt 34 of the adjusting device 18 is also formed rotationally symmetrical. The tilted control surface 32 then forms a control cone, which is integrated in the head part 36 as a functional part, with the contact surface 30 of the contactable ring component 10 being formed with corresponding inclination to the control cone as a contact cone and likewise having its installation space sunk in the ring component 10. The control cone is then, while contacting the contact cone in the fixed state of the adjusting bolt 34, as depicted in FIG. 1, wholly received in the contactable ring component 10.

The forces diagram depicted in FIG. 1 clearly shows that, due to the angular force application, the axial feeding force 21 may be smaller than the applied feeding force in the axial direction in a comparable arrangement with standard cylinder head screws, as is depicted, for example, in FIG. 5 of DE 25 44 498 C3. In spite of this smaller axial feeding force 21, the contact surface 30 is, due to the angular force arrangement, in contact across broad surface sections with the control surface 32 with a predefinable frictional force. This frictional force results in a correspondingly large stoppage with the result that any restoring forces occurring cannot actuate the respective adjusting bolt 34 in a loosening manner. On the contrary, with correspondingly large designs for the machine element, at least one of the wall parts of control surface 32 and contact surface 30 may need to be treated in such a way that the friction coefficient is reduced, e.g., by coatings 32a, 30a, respectively, in order to ensure a reliable actuation with the actuation device 18. Preferably, a sliding lacquer is applied at the head part 36. For a surface treatment, phosphating the outsides of the head parts 36 may be useful. Such measures in any case allow the self-stopping effect for the cone parts in contact with one another to be reduced in a predeterminable manner, and in particular adjusted in a defined manner according to the application.

The use of the conically designed head parts 36 for the respective assignable adjusting bolts 34 allows the use, with the same overall size of the adjusting nut, of larger screws in the adjusting device 18, i.e. either the retaining effect can be increased or, with the same retaining effect, the number of screws 34, 36 can be reduced, which helps to save weight and costs. In addition, the conically formed head parts 36 of the screws or adjusting bolts 34 have a centering effect between the ring component 10, which acts as a retaining element of an adjusting nut here, and the ring component 12 as the actual load element.

The separation between the load element 12 and the retaining element 10 also allows the individual functional sections, for example in the form of the threaded parts 16, 14 and the planar contact, to be differently coated according to their function. For example, use of a coating with a high friction coefficient in the thread 14 of the retaining element 10 to obtain a better retaining effect may be possible. Accordingly, a coating with a lower friction coefficient could be selected in the thread 16 and on the planar surface of the load element 12 for the purpose of avoiding stick-slip effects and for improved transfer of the tightening torque by the adjusting device 18 into an axial preload force.

In the exemplary embodiment according to FIG. 1, the two ring components 10, 12 as a retaining element or load element are connected to one another by a diaphragm part 40 in the standard manner for adjusting nuts. Dispensing with the diaphragm part 40 here is also conceivable, so that the expensive manufacturing of the diaphragm part 40 can be avoided. The two ring components 10, 12 would, as an adjusting nut part, then be controlled only by the threaded bolts of the adjusting device 18. Since a media-permeable gap is created in such a case between the adjacent to one another face surfaces of the ring components 10, 12, that gap can be sealed by interposing or vulcanizing an additional plastic ring (not depicted), which can be advantageous, for example, in the food industry for the avoidance of dirt nests. At the same time, a spring or damping effect can be achieved by the plastic ring, which influences the adjustment relative to one another of the two ring components 10, 12 by the adjusting device 18. The individual ring components 10, 12 can each also optionally have an external thread instead of an internal thread, so that a two-part locking screw (not depicted) is obtained in a conventional manner. In addition, the internal and external diameters for the respective ring components 10, 12 could be selected differently according to the respective third component to be received in the region of the internal central cavity 42 of ring component 10 and ring component 12.

The use of the control cone at the head part 36, which tapers towards the ring component 12 and which opens towards the bore hole 44 of the first ring component 10, which is coextensive with the bore hole 38 in the second ring component 12, which is provided with an internal thread for the engagement with a correspondingly formed external thread of the adjusting bolt or threaded bolt 34, makes clear that, in spite of the axial length reduction there is still a great deal of residual wall part material for the first ring component 10 to allow adequate support of the application of angular force along the force element 20. Failure of the machine element is ruled out in this respect, even if the ring components 10 viewed in the axial direction of construction have to be reduced in dimension as much as possible. For the purpose of additional installation space optimization, in addition to the contact cone, the head part 36 of the respective adjusting bolt 34 has an additional cone part 46. Additional cone part 46 tapers towards an engagement part 48 for the engagement or attaching of an actuation device, not depicted in greater detail, in an outwards direction towards the surrounding area and preferably by 45° relative to the longitudinal axis 26 of the machine element. In this way, an outwards projecting expanding head form is provided, which form allows sufficient space for receiving the engagement part 48 in the head part 36, so as to thus allow the attaching of a suitable actuation tool. An engagement part 48 having an enlarged diameter can then be obtained for an improved attaching with the actuation tool compared with solutions in which the additional cone 46 is omitted. The engagement part 48 would be directly introduced into the control cone from its free face side that, as control surface 32, would then lock flush with the front free face side 50 of the ring component 10 and then offers only little space viewed in the radial direction. As an engagement part 48, a carrier profile in a frequent round shape should preferably be used.

Overall, the machine element solution according to the invention allows the production of a modular construction system, in which, for example, differently formed ring components 12, as a load element of the locking nut or adjusting nut may be combined with only one type of ring component 10 as a retaining element. If the spring or diaphragm system shown in FIG. 1, i.e. the diaphragm part 40, is omitted, the entire adjusting nut as a machine element can in turn be reduced in installation length accordingly. Furthermore, materials for the diaphragm part 40 that are challenging from a manufacturing technology perspective, but that are required for this task, such as stainless steels or titanium, which can be machined only with great difficulty, can be omitted. This omission is advantageous for economical manufacturing. The machine element shown in FIG. 1 can, again provided that the diaphragm part 40 is omitted, be delivered as a packaging unit to the customer or interested party, who then initially constructs the machine element as a whole on site and then completes it on the third component. This helps the locking nut manufacturer to save assembly costs.

If, in accordance with the depiction in FIG. 1, the internal threaded sections 14, 16 for the ring components 10, 12 are omitted, this omission results in planar, cylindrical inner circumferential surfaces, which delimit the inner central cavity 42 radially outwards. With the same adjusting device construction 18 according to the invention, instead of an adjusting nut, a clamping unit or a guide sleeve is then obtained, as well as significant portions of a bearing, for example in the form of a radial slide bearing (not depicted). Furthermore, as demonstrated in the prior art, more than two ring components 10, 12 can be used according to the application.

While one embodiment has been chosen to illustrate the invention, it will be understood by those skilled in the art that various changes and modifications can be made therein without departing from the scope of the invention as defined in the claims.

The invention claimed is:

1. A machine element, comprising:
   individual first and second ring components fixable to a third component and concentric to a longitudinal axis, said first ring component having a contact surface being tilted and forming a contact cone, said first and second ring components being threaded rings fixable to threads of said third component;
   an adjusting device actuating said first ring component in a feeding movement in an axial direction along said longitudinal axis with an angled force application toward said second ring component in a tilted direction deviating from the feeding direction in the axial direction by said adjusting device contacting said contact surface, said adjusting device having a non-threaded section with a control surface therein, said control surface being tilted and following tilting of said contact surface in a same direction when the adjusting device is actuated, said contact surface being formed as a contact cone with a cone axis parallel to said longitudinal axis, said adjusting device including an adjusting bolt applying an angular force by a head part thereon to said first ring component, said head part having a greater diameter relative to said adjusting bolt, said adjusting bolt penetrating said first ring component and being connected to said second ring component, said control surface forming a first control cone in a fixed state thereof being wholly received by said contact cone of said first ring component, said head part having a second cone part tapering and narrowing toward an engagement part engagable with an actuation tool for said adjusting bolt, said second cone part tapering and narrowing toward a surrounding area and forming an outwardly projecting expanding head, at least one of said contact surface or said control surface having a surface treatment reducing friction coefficients between said contact surface and said control surface; and a diaphragm part with a radially extending thin-walled section having a first surface facing and spaced from said first ring component to define a first gap between said thin walled section and said first ring component, having a second surface facing and spaced from said second ring component to define a second gap between said thin-walled section and said second ring component and connecting said first and second ring components to one another in a back-to-back arrangement whereby, thread flanks of threads of said first and second ring components can be fixed to thread flanks of the third component with uniform clamping forces.

2. The machine element according to claim 1 wherein said head part is enlarged radially relative to a threaded portion of said adjusting bolt extending axially from said head part.

3. The machine element according to claim 1 wherein said surface treatment is a coating.

4. The machine element according to claim 3 wherein said coating is a sliding lacquer coat.

5. The machine element according to claim 1 wherein said first and second ring components are separated from one another by said diaphragm part.

6. The machine element according to claim 1 wherein said thin-walled section of said diaphragm part extends continuously and entirely about said longitudinal axis.

7. The machine element according to claim 1 wherein said first and second ring components are outermost ring elements with internal threads.

8. The machine element according to claim 1 wherein said first and second ring components and said adjusting device form one of an adjusting nut, a clamping nut, a guide sleeve or a bearing.

9. The machine element according to claim 1 wherein said surface treatment comprises plural coatings.

10. The machine element according to claim 9 wherein said coatings comprise applied sliding surface coats.

* * * * *